US008649638B2

(12) United States Patent
Gupta et al.

(10) Patent No.: US 8,649,638 B2
(45) Date of Patent: Feb. 11, 2014

(54) METHOD FOR MEASURING THE DEFORMATION OF A SPECIMEN USING A FIBER OPTIC EXTENSOMETER

(75) Inventors: Nikhil Gupta, Ossining, NY (US); Nguyen Quang Nguyen, New York, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 0 days.

(21) Appl. No.: 13/611,159

(22) Filed: Sep. 12, 2012

(65) Prior Publication Data
US 2013/0240718 A1 Sep. 19, 2013

Related U.S. Application Data

(62) Division of application No. 12/855,424, filed on Aug. 12, 2010, now Pat. No. 8,428,400.

(60) Provisional application No. 61/235,378, filed on Aug. 20, 2009.

(51) Int. Cl.
*G02B 6/00* (2006.01)
(52) U.S. Cl.
USPC .............. 385/13; 385/12; 385/15; 385/31; 385/32

(58) Field of Classification Search
USPC .................... 385/12, 13, 15, 31, 33
See application file for complete search history.

(56) References Cited

U.S. PATENT DOCUMENTS 7,174,061 B2 * 2/2007 Rougeault et al. .............. 385/13
7,483,598 B2 * 1/2009 Loock et al. .................... 385/12

FOREIGN PATENT DOCUMENTS

JP          61122516 A   *   6/1986

* cited by examiner

*Primary Examiner* — Jennifer Doan
(74) *Attorney, Agent, or Firm* — Laurence P. Colton; Smith Risley Tempel Santos LLC

(57) ABSTRACT

A method for measuring the deformation of a specimen using an extensometer having a loop of a single-mode optical fiber. At least two points of the loop are attached to desired locations on a specimen. Light is transmitted through the loop and the transmitted optical power is measured by a photodetector. The deformation of the specimen causes the size and shape of the loop to change, which changes the transmitted optical power. The change in optical power is related to extension or compression using calibration curves. The sensor works on the principle of transmitted power modulation through the curved section.

6 Claims, 8 Drawing Sheets (a)

(b)

(a) (b)

(a) (b)

METHOD FOR MEASURING THE DEFORMATION OF A SPECIMEN USING A FIBER OPTIC EXTENSOMETER

STATEMENT OF RELATED APPLICATIONS

This patent application is a division of U.S. patent application Ser. No. 12/855,424 having a filing date of 12 Aug. 2010, currently pending, which is based on and claims the benefit of U.S. provisional patent application No. 61/235,378 having a filing date of 20 Aug. 2009, both of which are incorporated herein in its entirety by this reference.

BACKGROUND OF THE INVENTION

1. Technical Field

The invention is generally related to the field of extensometers and to the field of devices that measure the extension or strain in a specimen subjected to tension, compression, flexure, impact or other loading conditions. The invention also relates to extensometers that can be used across cracks and on surfaces with a high degree of roughness in a specimen.

2. Related Art

An extensometer measures the change of distance between two points on a specimen by attaching its two extension legs to the specimen and then activating the extensometer. FIG. 1 illustrates a known extensometer. Some problems in current extensometers include the generally large size of current devices, which can induce stresses in the specimen, and the occurrence of knife-edge slip, which can lead to incorrect measurements. In addition, many current extensometers are supported on the specimen itself, which can produce substantial bending of the specimen, or at least induce bending stresses. Such bending or bending stresses generally are not acceptable, and are especially unacceptable in biological and soft materials. Known non-contact extensometers, for example laser extensometers, may eliminate the slip problems but they are high cost instruments and can be used only on certain types of materials, specimen shapes, and/or surface finishes. Most commercial extensometers are able to take measurements in only one direction (either tension or compression) or only in a plane.

Some Fiber Bragg Grating (FBG) fiber-optic based extensometers have been developed for use in structural health monitoring. Yet the large size, diligent setup, and low sensitivity and dynamic range of these FBG extensometers are disadvantages. FBG extensometers also generally cannot be used on small diameter specimens, crack opening type measurements, and irregular surfaces.

Common strain gauges also suffer from the same disadvantages mentioned above and demand perfect bonding with the surface and high degree of surface finish. In addition, measurements obtained from these strain gauges strongly depend on the adhesive used in bonding them with the specimen.

Fiber-optic microbend sensors suffer from the disadvantage of having lower relative durability as the fiber is curved in micrometer radius. The microbend sensors also have a larger size, which is not appropriate in embedding inside materials or structures for structural health monitoring.

U.S. Pat. No. 7,174,061 B2 to Rougeault et al. discloses a known extensometer to measure the deformations of a host material. This extensometer comprises at least one test specimen and at least one Bragg grating formed in an optic fiber which is made integral with the test specimen. Any deformation of the host material is transmitted to the Bragg grating and the Bragg grating is configured to then being able to modulate the light propagating in the fiber. The deformation of the host material is determined by calibrating the modified light with respect to known forces and deformation. The test specimen undergoes linear bending stresses while remaining within its range of elastic deformation. This extensometer also comprises mechanical means able to transform deformation of the host material into bending of the test specimen, which deforms the Bragg grating. The mechanical means comprises a first part, intended to be made rigidly integral with the host material and in which the test specimen is fixed, and a second part also intended to be made rigidly integral with the host material and which is able to move within the first part and to cause bending of the test specimen.

U.S. Pat. No. 6,956,981 B2 to Dewynter-Marty et al. discloses another known extensometer comprising an optical fiber, in which at least one Bragg grating is formed, and at least one proof body configured to be rigidly fixed to a host material and that surrounds part of the optical fiber containing the Bragg grating. Any deformation of the host material is transmitted to the Bragg grating through the proof body. The Bragg grating is configured to modify a light propagating in the optical fiber. Any deformation of the host material is determined from the modified light. The proof body comprises a tube in which the part of the optical fiber containing the Bragg grating is placed, with two ends of the part of the optical fiber being fixed to corresponding two ends of the tube and the part of the optical fiber is tensioned between the two ends of the tube.

U.S. Pat. No. 5,090,248 to Cimmino et al. discloses another known extensometer for measuring dimensional change. This extensometer comprises two or more adjacent electrical conductors selected and configured to allow relative positioning changes thereof to cause a change in electrical interaction between said conductors. The conductors are thin, pliable, electrically conductive wires wound in the form of interposed helical coils. The coils include at least two adjacent turns that are completely encased in an elastic dielectric material as a principal means for restoring the wires to their original configuration after a positioning change thereof. The configured electrically conductive wires and the restorative elastic material combined facilitate accurate conformability during use and accurate measurement of small and substantial displacements, extensions, dilation, and torsions about a longitudinal extent of the extensometer.

U.S. Pat. No. 5,258,614 to Kidwell et al. discloses a known fiber optic loop temperature sensor, comprising a first multimode optical fiber being formed with a plurality of loops, a light source, a second reference optical fiber, and optical detecting means. The loops each have a predetermined radius fixed with securing means. The first optical fiber is positioned in an environment in which a temperature is to be measured. The light source is for supplying light in only one direction to said signal optical fiber. Each of the loops changes in diameter as a function of temperature to effect changes in light transmission therethrough. The second reference optical fiber receives light from the light source for providing a reference light intensity. The optical detecting means is for measuring light intensities from both optical fibers to determine the temperature from differences therein.

Current mechanical or laser extensometers, strain gauges, Fiber-Bragg gratings, and fiber-optic interferometers are used for displacement or strain measurement. However, the sensitivity of such current mechanical extensometers is much lower than that of optical extensometers. Additionally, such current mechanical extensometers tend to be bulky. Accordingly, there is always a need for an improved extensometer. Additionally, there is always a need for an improved extensometer that does not cause undue stress on or bending of the sample. Further, there is always a need for extensometers that can be more easily attached to samples and that do not necessarily require a high degree of surface finish. It is to these needs, among others, that this invention is directed.

BRIEF SUMMARY OF THE INVENTION

When using extensometers to measure the displacement of a system, one problem that can occur that can result in inaccurate measurements is when the extensometer is applied across a crack to measure the crack opening or closing displacement. The load applied by the extensometer can cause the crack to open or close. In problems such as the opening of an existing crack under an applied load, it is difficult to precisely measure the displacement in the system with bulky extensometers or strain gauge type sensors. Current strain gauges and fiber-optic sensors cannot provide direct measurement of displacement across such a crack because these devices are bonded to the structure. Bonding these devices across the crack can significantly change the crack opening rate. The extensometer of the present invention can be used on the structure across a crack to obtain direct measurement of displacement.

In biological specimens of high compliance there is a significant amount of extension under small amount of applied load. These biological specimens, such as muscles, skin, or ligaments, require use of highly compliant extensometers. The extensometer of the present invention can be used on these materials.

Structures of irregular shape, size, and surface finish also can be tested with the extensometer of the present invention without any specific preparation. This is beneficial in making in-situ measurements.

The extensometer of the present invention is made by creating a loop of a single-mode optical fiber, such as a single mode step index optical fiber. This loop is excited by a laser source and the transmitted optical power is measured by a photodetector. When loops of smaller than a critical radius are created, the transmitted optical power is lower than the input power. The ratio of transmitted and input powers depends on the loop radius. The coating and cladding of the optical fiber are maintained intact on the fiber in this device.

In loops of multimode fibers, deformation of the loop leads to a reduction in transmitted power though the fibers in a linear fashion. However, transmitted power-displacement curves obtained in deformation of loops of single-mode fibers show several intermediate resonance peaks in otherwise linearly reducing curve. Therefore, it is possible to use the extensometers of the present invention in a dual measurement range. In the larger measurement range, the transmitted power-displacement curve can be approximated with a linear trend by ignoring intermediate resonance peaks. This can be practically achieved by having a lower data acquisition rate. In addition, the extensometers of the present invention can be used in a narrower measurement range, within two successive resonance peaks, to obtain high sensitivity measurements.

The extensometer can be made by creating an optical fiber loop of desired radius. The extensometer also can be made by compressing a larger size loop or stretching a smaller size loop until the desired radius is obtained.

Two points of the optical fiber loop or the entire optical fiber loop of the present invention can be attached to desired locations on the specimen. Light is transmitted through the loop. The extension, compression or bending of the specimen will cause the size and shape of the loop to change, which will change the transmitted optical power. The change in optical power can be related to extension using calibration curves.

This type of sensor works on the principle of transmitted power through the curved section and is distinct from interferometry based sensors such as those described in U.S. Pat. No. 5,258,614.

These uses and features, and other uses, features and advantages of the present invention, will become more apparent to those of ordinary skill in the relevant art when the following detailed description of the preferred embodiments is read in conjunction with the appended figures.

DETAILED DESCRIPTION OF THE PREFERRED EMBODIMENTS

General Description

Figure 1:
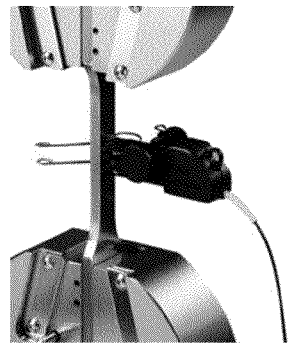
FIG. 1 illustrates two prior art mechanical extensometers from Instron.com, with FIG. 1a being a static axial clip-on extensometer and FIG. 1b being a separable axial clip-on extensometer.
Figure 1:
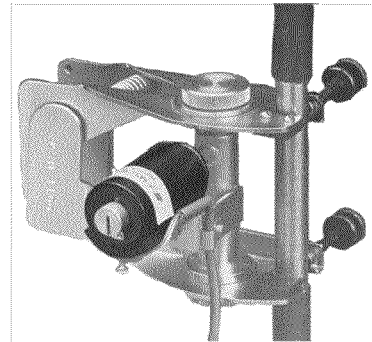
Figure 2:
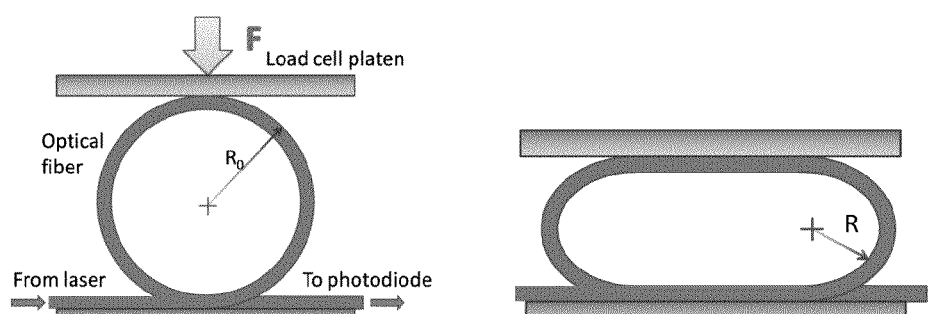
FIG. 2 illustrates an optical fiber loop sensor of the present invention and its working principal.
Figure 3:
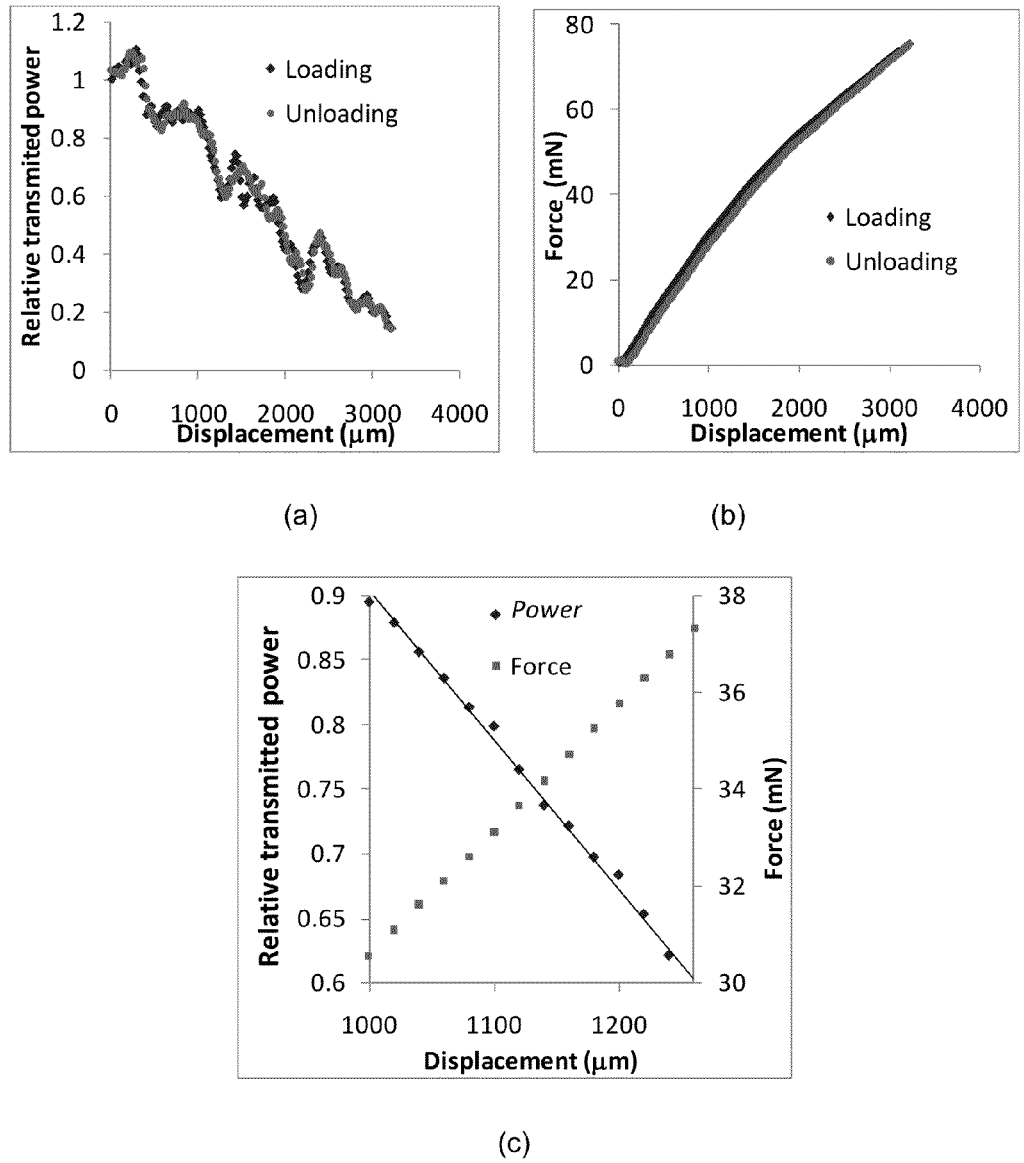
FIG. 3 are graphs of the loading and unloading of an optical fiber loop of 6 mm radius, with FIG. 3a showing the relative transmitted power, FIG. 3b showing the force applied, and FIG. 3c showing the data within the range of one of the intermediate resonance peaks with respect to the displacement. Appearance of intermediate resonance peaks, noted in FIG. 3a, is an important phenomenon. Correlation of power loss with respect to the force and displacement enables use of this system as a sensor in this measurement range.

FIG. 2 illustrates an optical fiber loop sensor illustrative of the present invention and its working principle. As can be seen, the invention comprises an optical fiber loop that can be attached to a specimen, typically at two points, but the optical fiber loop also can be attached at multiple points, completely bonded to the specimen, or embedded inside of the specimen. FIG. 3 shows graphs of the loading and unloading of a representative optical fiber loop having a 6 mm radius. FIG. 3a shows the relative transmitted power (ratio of power transmitted through the deformed and undeformed loops) of the light through the loop. FIG. 3b shows the loop deformation with respect to the applied force. FIG. 3c shows correlation between the relative transmitted power, load, and displacement within one of the intermediate resonance peaks to show the possibility of a dual measurement range. Note that the slope of the relative transmitted power in FIG. 3c is two orders of magnitude higher than that in FIG. 3a for the entire curve.

Figure 4:
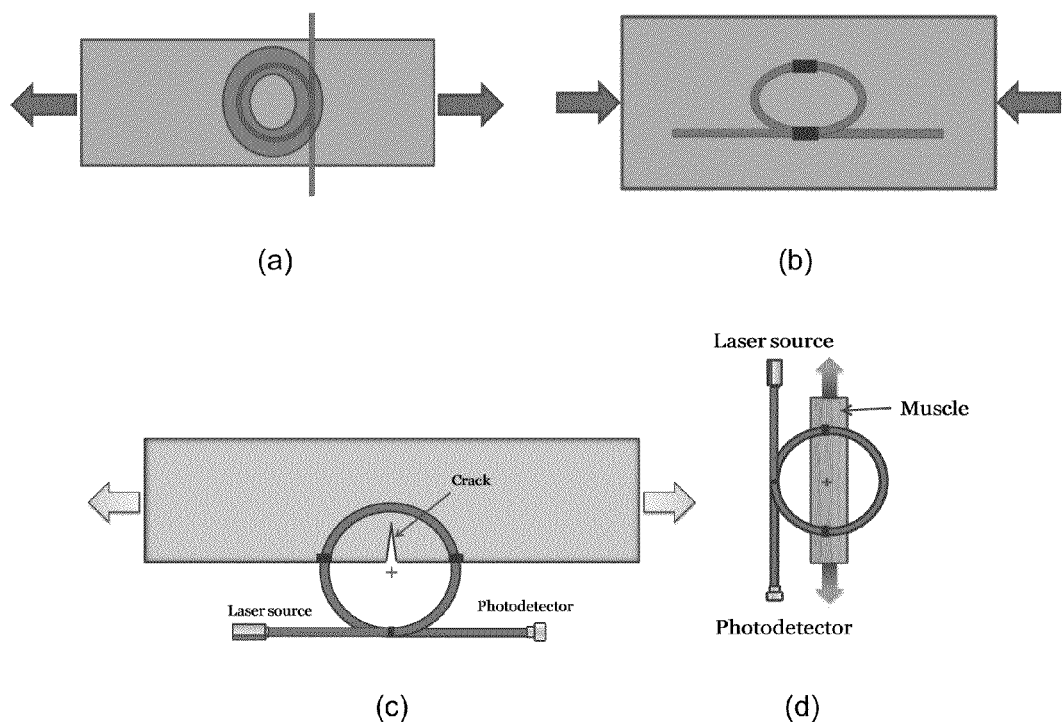
FIG. 4 shows schematics of the fiber-loop based extensometer of the present invention attached to illustrative substrates, with FIG. 4a showing the device completely bonded on the surface of a specimen, FIG. 4b showing the device attached to the surface only at two points, FIG. 4c showing the device attached across a crack, and FIG. 4d showing the device attached to a flexible biological specimen such as a muscle. The device can be either attached to the surface or embedded inside the specimen in a configuration suitable to obtain displacement measurements.
Figure 5:
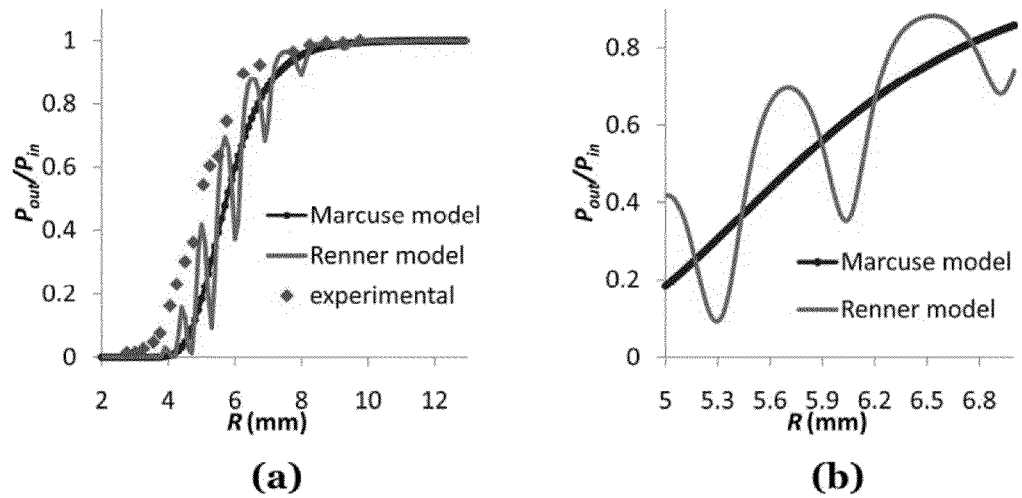
FIG. 5a is a comparison of calculated and experimentally measured power attenuation and FIG. 5b is a closer view of three successive peaks shown in FIG. 5a, for the present invention.

FIG. 4 shows four schematics of the illustrative fiber-loop based extensometer of the present invention embedded on illustrative substrates. FIG. 4a shows the invention bonded completely to the surface. FIG. 4b shows the invention bonded to the specimen only on two points. FIG. 4c shows the invention bonded across a crack. FIG. 4d shows the invention embedded on a sample organic tissue, namely a muscle. As the device is made of a single optical fiber, its weight is negligible compared to the weight of most of these specimens.

FIGS. 5-12 show some more specific illustrative setups and data for embodiments of the invention.

Referring now to FIG. 2, the extensometer of the present invention is made by creating a loop of a single-mode optical fiber. This loop is excited by a laser source, or other suitable light source, and the transmitted optical power is measured by a photodetector. The loop has a radius smaller than a critical size, referred to herein as the critical radius. It has been theoretically found that the critical loop radius is 34.5 mm for the Corning SMF28e fiber excited at 1.3 micron laser wavelength. Experimentally, loops of about 9 mm radius or smaller are preferred to obtain a steep intensity drop with displacement. When loops of smaller than the critical radius are created the transmitted optical power is less than the input power due to losses from the curved section. Smaller size loops lead to higher losses. Compared to the existing studies on loop sensors which used multi-mode fibers, the present sensor using single-mode fiber provides at least two advantages of (a) being able to work in two different sensitivity and measurement ranges and (b) being several orders of magnitude more sensitive. The high sensitivity range exists because of an interference phenomenon that is observed in single-mode fibers. Thus, the present invention uses a loop of a radius that is suitable for obtaining the desired or necessary resonance and that provides very high sensitivity.

In one embodiment of the invention, two preferably opposing points of the loop are attached to the desired locations on the specimen. Attachment can be by known means, including for example adhesive, clamps, stitching, or welding. The extension, compression or bending, hereinafter sometimes referred to generally as deformation, of the specimen causes the size and shape of the loop to change, which changes the optical power of the light being transmitted through the loop. The change in optical power can be related to the deformation using calibration curves. The sensor of the present invention works on the principle of transmitted power loss through the curved section and is distinct from interferometry based sensors.

Referring now to FIG. 3, the use of single-mode fibers instead of multi-mode fibers causes significant differences in the physics of the optical power losses. It can be observed that compared to a linear approximation of optical power loss, which is generally the case in multi-mode fibers, there are several intermediate peaks in the graph for single-mode fibers. Theories that are based on the assumption that the cladding is of infinite radius do not predict the presence of these intermediate peaks. However, the finite radius of the cladding causes internal reflections and leads to these peaks. The sensor operates between two of these peaks to provide sensitivity of greater than 10 microns in the displacement measurements, as shown in FIG. 3c. The use of single-mode fiber and dual measurement ranges caused by intermediate peaks makes this invention distinct from microbend sensors.

Referring now to FIG. 4, a general schematic of fiber-loop based extensometer of the present invention embedded on illustrative substrates is shown. For example, these figures show the use of the extensometer for displacement where applied tensile or compressive forces will cause the loop-radius to change, which will provide change in the transmitted power. Other loading conditions will also cause similar effects. FIGS. 4a and 4b show the extensometer bonded to the specimen surface in two possible configurations, and 4c shows the extensometer deployed across a crack in a specimen. FIG. 4d shows the extensometer deployed on a biological specimen, a small section specimen, or a compliant specimen. More specifically, FIG. 4c shows the device embedded on a structure and FIG. 4d showing the device embedded on a muscle. The possibility of attaching the extensometers only at two points removes the requirement for having a high degree of surface finish. The extensometer can also be deployed on curved, undulated, or textured surfaces using A similar procedure without any surface preparation.

The sensor can be used for many purposes, including the following illustrative purposes:

Monitoring deformation in materials and structures under tensile, compressive, flexural, fatigue, or impact loading conditions, for example, in standard laboratory tests or under service conditions in structures such as buildings, bridges, aircraft wings, and wind turbines;

Monitoring displacement, measurement of crack propagation rate, and health monitoring in civil engineering structures such as bridges, dams, and buildings;

Crack detection and health monitoring in aeronautics and space structures;

Measurement of distance between two objects or surfaces that are a small distance apart; and Testing of biological samples and highly compliant materials for mechanical properties.

In use, the optical fiber loop is attached to a specimen. As shown in FIG. 4, the device can be attached to the specimen at least two points, and preferably two points diametrically opposite each other. The device can be attached to all suitable specimens, with a typical structural specimen such as a metal/polymer/ceramic/composite specimen shown in FIGS. 4a through 4c and a typical biological specimen such as a piece of muscle shown in FIG. 4d. One end of the loop is attached to a light source, such as a laser. The other end of the loop is attached to a photodetector. A splitter can be used to obtain a reference signal to normalize the transmitted power through the loop and eliminate the effect of fluctuation of input power at the light source. The light source is activated by sending a beam of light through the loop, and the photodetector detects the light. The specimen then is extended or compressed in controlled manners. The extension or compression of the loop changes the transmitted optical power through the loop. The photodetector detects this change in optical power, which can be related to the extension or compression using calibration curves. The photodetector can be coupled to a computer having a database of such calibration curves, thus resulting in a computerized system for detecting and measuring the extension or compression of the specimen.

Illustrative Embodiment

Fiber-optic sensors have become an important class of sensors for structural health monitoring in aerospace and automobile applications. The possibility of using fiber-optic sensors in fiber reinforced composite plates and pipes is very attractive because one of the glass fibers or a fiber tow can be replaced with an optical fiber. Power modulation based sensors are of particular interest for such applications because of their simple construction and sensing principle. These sensors rely on optical intensity losses through curved waveguides. Bending an optical fiber beyond a critical radius results in optical power losses through the curved section due to coupling between guided and radiation modes. The higher-order modes in a multimode optical fiber are coupled out of the fiber. This phenomenon in multimode fibers results in a linear relation between displacement and intensity change.[1,2] A change in the bend radius by applied force, temperature, or any other parameter causes the transmitted power to change, which can be calibrated and used as the sensing principle. Other applications of such power modulation based sensors are in measuring humidity,[3] strain,[3-5] index of refraction of a liquid,[6] liquid level in a vessel,[7] and high-frequency noise in a combustion engine.[8]

Microbend sensors, created by bending an optical fiber in a series of micron size curved sections, are based on intensity modulation principle. However, microbend sensors operate in a small displacement range, which limits their applications to systems where total displacement is only a few microns. In some recent studies, a complete loop is created in the fiber, which overcomes some of the limitations of microbend sensors. The principle of loop-sensors is illustrated in FIG. 2. The Q-factor of loop-sensors made of very small diameter fibers is demonstrated to be as high as $10^{10.9}$ These sensors have been used for force and displacement measurement in robotic grippers.[2]

Compared to multimode fibers, use of single-mode fibers causes significant differences in the physics of intensity losses.[10-12] Unlike multimode fibers, the transmitted power-displacement relationship for a loop of single-mode fiber is not linear. Several intermediate peaks are observed in the transmitted power and their appearance is consistent in the loading and unloading cycles, as shown in FIG. 3. The data presented in this figure are obtained with a displacement step of 20 μm. The trend of power-loss observed in FIG. 3 can be approximated as a linear trend if the presence of intermediate peaks is neglected. Experiments carried out at low data acquisition frequencies or at higher displacement steps can miss these peaks and show a nearly linear relationship between transmitted power and displacement. This phenomenon allows developing a dual range sensor using single-mode optical fibers, where use of intermediate peaks can lead to very high sensitivity measurements in a short displacement range and a linear approximation can be used for measurements in a larger displacement range. While this optical effect in single-mode fibers has been known in the field of optics and communication, use of this phenomenon in creating sensors has not received attention. In the present invention the simplicities of the intensity modulation approaches and the loop-sensor construction are combined to develop a high sensitivity sensor having a dual measurement range.

1 Theoretical Analysis

Creating a curved section in a fiber leads to optical power losses. In this case, the power transmission through an optical fiber loop is defined as $$\bar{P}_R = \frac{P_{out}}{P_{in}} \tag{1}$$

where $P_{in}$ and $P_{out}$ are the input and the output optical power, respectively. Deforming the loop causes a change in the bend radius and the relative transmitted power from a deformed loop is defined as $$\bar{P} = \frac{P'_{out}}{P_{out}} \tag{2}$$

where $P'_{out}$ is the output power through the deformed loop. The appearance of intermediate peaks is an effect where the light leaked out of the core reflects back from the cladding/coating and coating/air interfaces, couples with the light in the fiber core, and generates resonance peaks.[12] A large number of theoretical models available for estimating power loss due to bending assume coating and cladding thicknesses to be infinite. Such models cannot predict the presence of intermediate peaks and provide a linear approximation for the intensity loss.[18] Several modified approaches are now available to account for the presence of interference peaks. These approaches include use of ray optics theory,[19,20] wave optics theory,[12] or solving Maxwell equation in equivalent Cartesian coordinates.[10,11,21] The Renner's method is adopted in disclosing the present invention due to its simplicity and high accuracy.[10]

The power transmission through an ideal step-index single-mode optical fiber having an infinitely thick cladding is given by[18]

$$\frac{P_{out}}{P_{in}} = \exp(-2\alpha_B l_B^e) \tag{3}$$

where $l_B^e = 2\pi R^e$ and $R^e$ is the effective bend radius while considering the effect of bending stress on the index of refraction of the fiber core material. $R^e$ differs from the actual bend radius, R, by an elastooptical correction factor, which is taken as 1.28 for the SMF28e fibers used in this study.[22,23] The bend loss coefficient is denoted by $2\alpha_B$, which is determined per unit length of the optical fiber. In ideal step-index single-mode fibers, $2\alpha_B$ is expressed as $$2\alpha_B = \frac{1}{2}\left(\frac{\pi}{\gamma^3 R^e}\right)^{1/2} \frac{\kappa^2}{V^2 K_1^2(\gamma a)} \exp\left(-\frac{2\gamma^3 R^e}{3\beta_0^2}\right) \tag{4}$$

where V, κ, and γ are defined as $$V = ak(n_{co}^2 - n_{cl}^2)^{1/2} \tag{5}$$

$$\kappa = (k^2 n_{co}^2 - \beta_0^2)^{1/2} \qquad (6)$$

$$\gamma = (\beta_0^2 - k^2 n_{cl}^2)^{1/2} \qquad (7)$$

Here, $n_{co}$ and $n_{cl}$ are indices of refraction of the core and cladding, respectively and a is the core radius. In addition, k is the wave number, which is related to the free-space wavelength by $$k = 2\pi/\lambda \qquad (8)$$

In Eq. (5). $K_1(\gamma a)$ is the modified Bessel function of the first order of the second kind and $\beta_0$ is the propagation constant of the leaky fundamental mode in the straight fiber, obtained by solving eigenvalue equation of the fundamental guided modes[24]

$$\kappa \frac{J_1(\kappa a)}{J_0(\kappa a)} = i\gamma \frac{H_1^1(i\gamma a)}{H_0^1(i\gamma a)} \qquad (9)$$

where $J_\nu(\kappa a)$ and $H_\nu^1(i\gamma a)$ are Bessel function and Hankel function of the order ν of the first kind. Eq. (9) must be solved by numerical techniques.

The present invention utilizes single-mode fiber SMF28e from Corning, N.Y. Fiber radius and index of refraction of the core, cladding, and coating materials at wavelength 1.31 μm, listed in Table I, are taken from the manufacturer's datasheets and from reference[23].

TABLE I

Radius and index of refraction of Corning SMF28e fiber

| Fiber Layer | Radius (μm) | Index of Refraction |
| --- | --- | --- |
| Core | 4.1 | 1.4517 |
| Cladding | 62.5 | 1.447 |
| Coating | 125 | 1.4786 |

For finite cladding thickness single-mode optical fiber, the bend loss coefficient derived by Renner[10] is calculated from pure bend loss coefficient as $$2\alpha_{BC} = 2\alpha_B \frac{2(Z_{ct} Z_{cl})^{1/2}}{(Z_{ct} + Z_{cl}) - (Z_{ct} - Z_{cl})\cos(2\theta_0)} \qquad (10)$$

where $2\alpha_{BC}$ is the bend loss coefficient in coated fiber and $2\alpha_B$ is the pure bend loss coefficient of the fiber with infinite cladding. Subscript ct is used for coating. The coefficients present in Eq. (10) are calculated as $$Z_{cl} = k^2 n_{cl}^2 (1 + 2b/R^e) - \beta_0^2 \qquad (11)$$

$$Z_{ct} = k^2 n_{ct}^2 (1 + 2b/R^e) - \beta_0^2 \qquad (12)$$

$$\theta_0 = \frac{\gamma^3 R^e}{3k^2 n_{cl}^2} \left(\frac{R_c}{R^e} - 1\right)^{3/2} \qquad (13)$$

where b is the cladding radius and $R_c$ is defined as the critical radius, or the maximum loop radius that will cause the total internal reflection required in the present invention, and is given as $$R_c = \frac{2k^2 n_{cl}^2 b}{\gamma^2} \qquad (14)$$

Closer observation of FIG. 3a shows intermediate peaks and dips in the optical power. Using Eq. (13) the appearance of these local maxima and minima can be predicted as[10]

$$\frac{4b\gamma R}{3\pi R_c} \left(\frac{R_c}{R^e} - 1\right)^{3/2} = \begin{cases} 2m - 1/2 & \text{for maximum} \\ 2m - 3/2 & \text{for minimum} \end{cases} \qquad (15)$$

where m is a positive integer. Theoretical calculations from Marcuse's model for infinite cladding and Renner's model containing interference peaks and the experimental data of power transmission through the loop with respect to the loop radii are plotted in FIG. 5a. The experimental results are obtained on loops of different radii without any applied force. As observed in FIG. 5a, the experimental data closely follow the theoretical trend. These low resolution measurements are not continuous and do not clearly show appearance of intermediate peaks like the high resolution experiments in FIG. 3. As per Eq. (14), in the present fibers loops of smaller than 34.5 mm radius will have intensity losses. For the loop radius close to this value the losses are small but as the radius is decreased further the losses appear to increase significantly in the range of 3-11 mm. Therefore, this range of loop radius is suitable for using as sensor.

A close observation of theoretical models in FIG. 5b shows that the slope of the intensity variation between each maxima and minima is significantly higher than the approximation offered by Marcuse's model. In narrow displacement ranges, such as 5.3-5.6 mm and 6.2-6.5 mm, the slope of the curve is two orders of magnitude higher than the linear approximation. In these ranges the sensor can provide significantly higher sensitivity compared to similar intensity modulation sensors made of multimode optical fibers. Results of a high resolution experiment conducted within one such range in a 6 mm radius loop are presented in FIG. 3c and clearly show that the force resolution of $10^{-4}$ N can be obtained in these sensors. The corresponding displacement measurement sensitivity can be better than the displacement step of 20 μm used in FIG. 3c.

2. Calibration of Loop-Sensors
2.1 Static and Quasi-Static Testing

Figure 6:
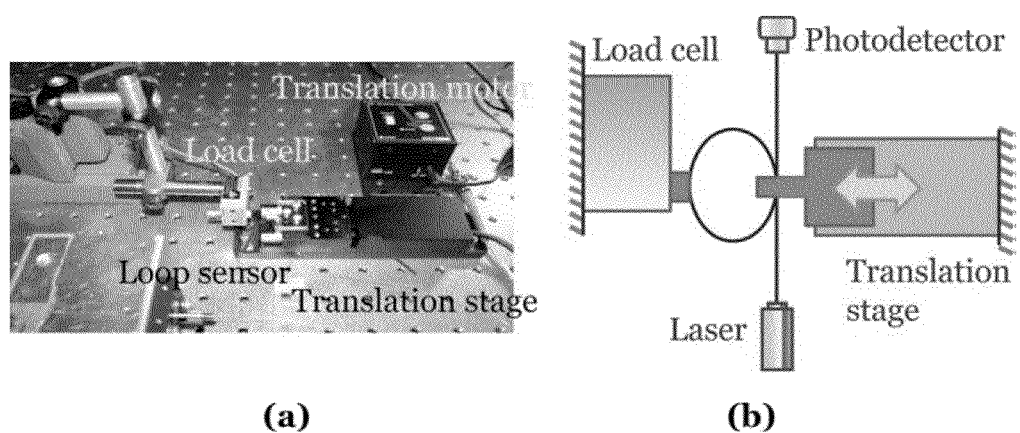
FIG. 6a is an experimental setup for the calibration of loop sensors and FIG. 6b is a schematic of functional components of loop sensors of the present invention.

The sensor calibration experiments were conducted using single-mode SMF28e fibers and a translation stage-load cell setup shown in FIG. 6. Fiber-loops were created by passing the ends of an optical fiber through opposite ends of a tube of 500 μm diameter and about 2 mm length, as shown in FIG. 6. In this configuration the optical fiber can be simply pulled through the tube to create a loop of desired radius and the tube is fixed on the translation state. Reducing the loop radius to smaller than 3 mm can damage the core and results in no transmission, which sets the lower limit on the sensor size using the present fibers. However, this limit on minimum radius is governed by the mechanical properties of the fiber material and can be different for plastic optical fibers and fibers of different core diameters.

Figure 7:
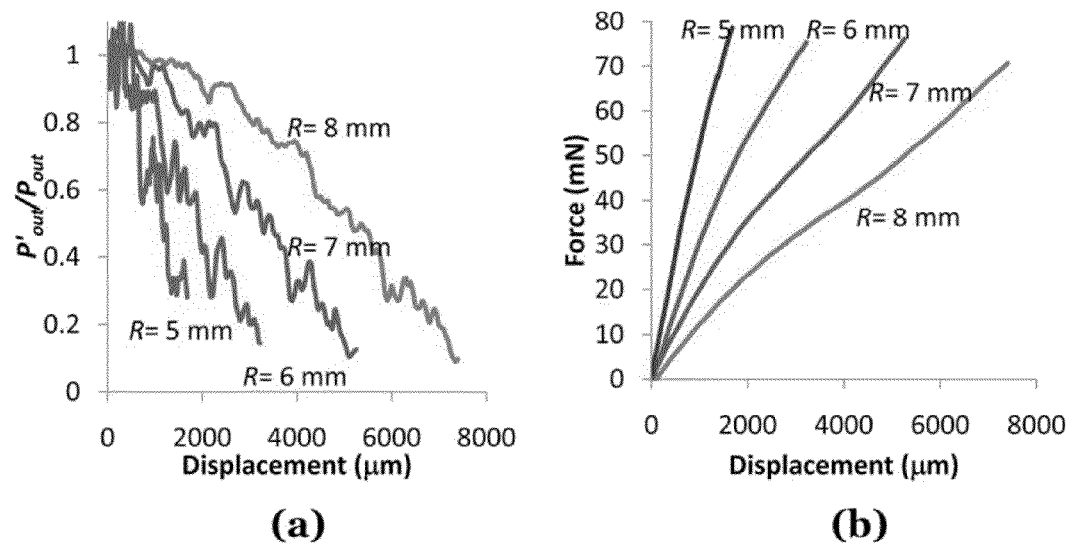
FIG. 7a shows the relative optical power-displacement and FIG. 7b shows the corresponding load-displacement relationships for loop sensors of the present invention of four different radii.
Figure 8:
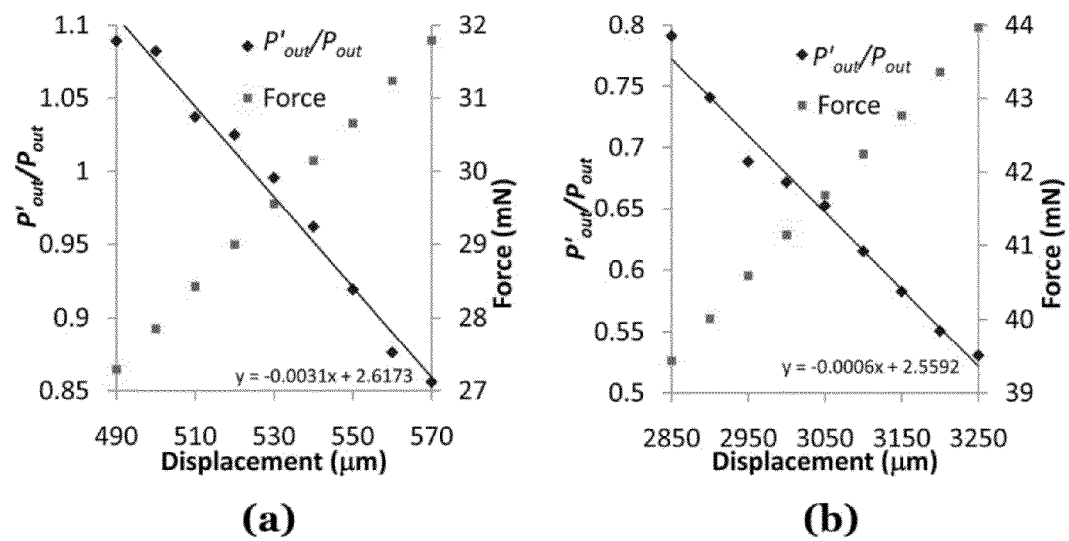
FIG. 8 shows the high sensitivity range of loop sensors of the present invention within one resonance peak, with FIG. 8a being for a loop of R=5 mm and FIG. 8b being for a loop of R=7 mm.

Further tests were conducted on loops of 5, 6, 7, and 8 mm radii and the results are presented in FIG. 7. The effective loop stiffness is higher for a smaller loop radius. Therefore, the measurement range of a smaller loop is lower but the sensitivity is higher. This is visible as a steeper slope for the curves related to smaller radius loops. Close observations in sensors of 5 and 7 mm radius in one of the resonance peaks are plotted in FIG. 8. The relative transmitted power-displacement slopes are $6 \times 10^{-4}$ and $3.1 \times 10^{-3}$ $\mu m^{-1}$ for the 5 and 7 mm loops, respectively, showing that the displacement sensitivity is higher in the smaller loop. In structural health monitoring applications smaller size sensors are preferred, so it is an advantage that the smaller size loops provide higher sensitivity. Following the linear approximation in their transmitted power curve over the entire length of the displacement, the sensitivity of 6 mm radius loop is approximated to be around $10^{-2}$ N for force and 100 $\mu m$ for displacement. While using the linear approximation, an increase in the displacement resolution beyond this level can lead to the possibility of false measurements due to the increased sensitivity to the intermediate resonance peaks. These results show that the loop-sensors can operate in two different measurement ranges.

2.2 Cyclic Loading of Loop-Sensors

Figure 9:
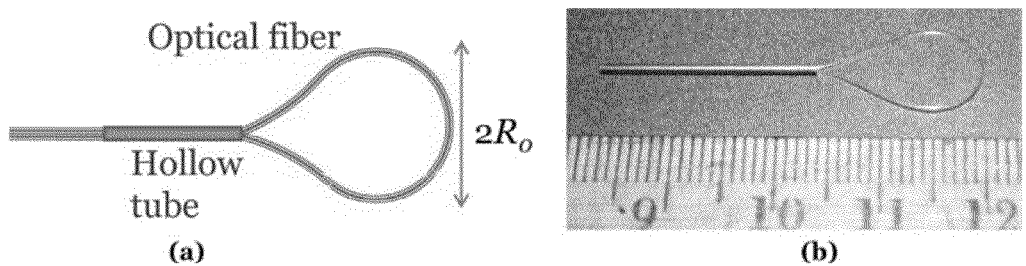
FIG. 9a shows a schematic and FIG. 9b shows a photograph of a pear-shaped loop sensor embodiment of the present invention.
Figure 10:
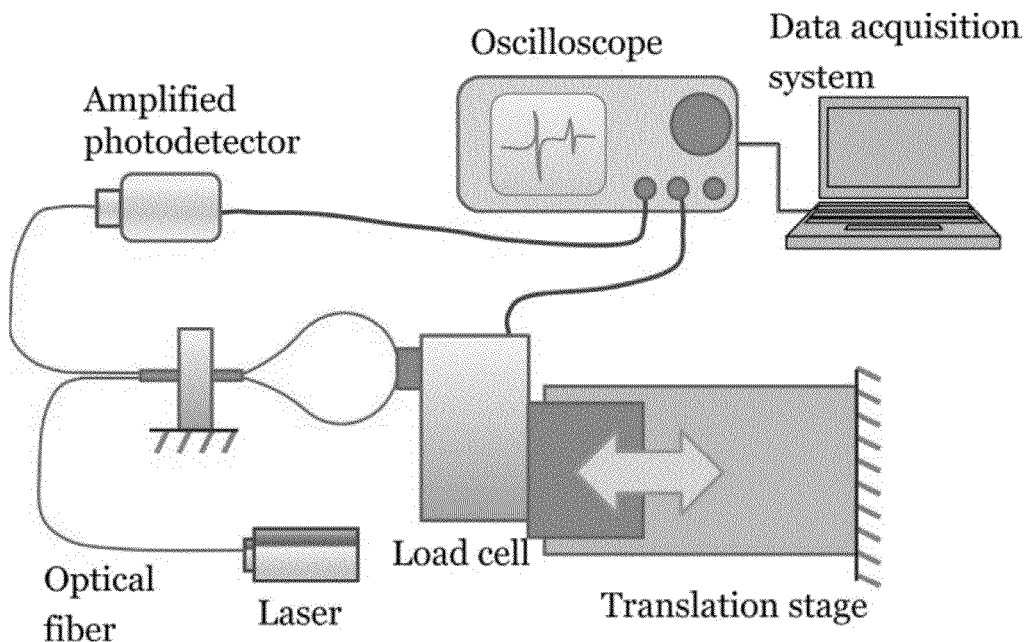
FIG. 10 shows an experimental setup for cyclic loading tests for lop sensors of the present invention.

Pear-shaped loops created by passing both ends of an optical fiber through a 500 $\mu m$ diameter tube, shown in FIG. 9, are used for fatigue testing. An illustrative experimental setup for the testing of such a loop is shown in FIG. 10. In this setup the loop sensor is fixed and the load cell mounted on a translation stage is moved to load the sensor in the loading-unloading cycle. The loop is free to deform in its natural shape.

Figure 11:
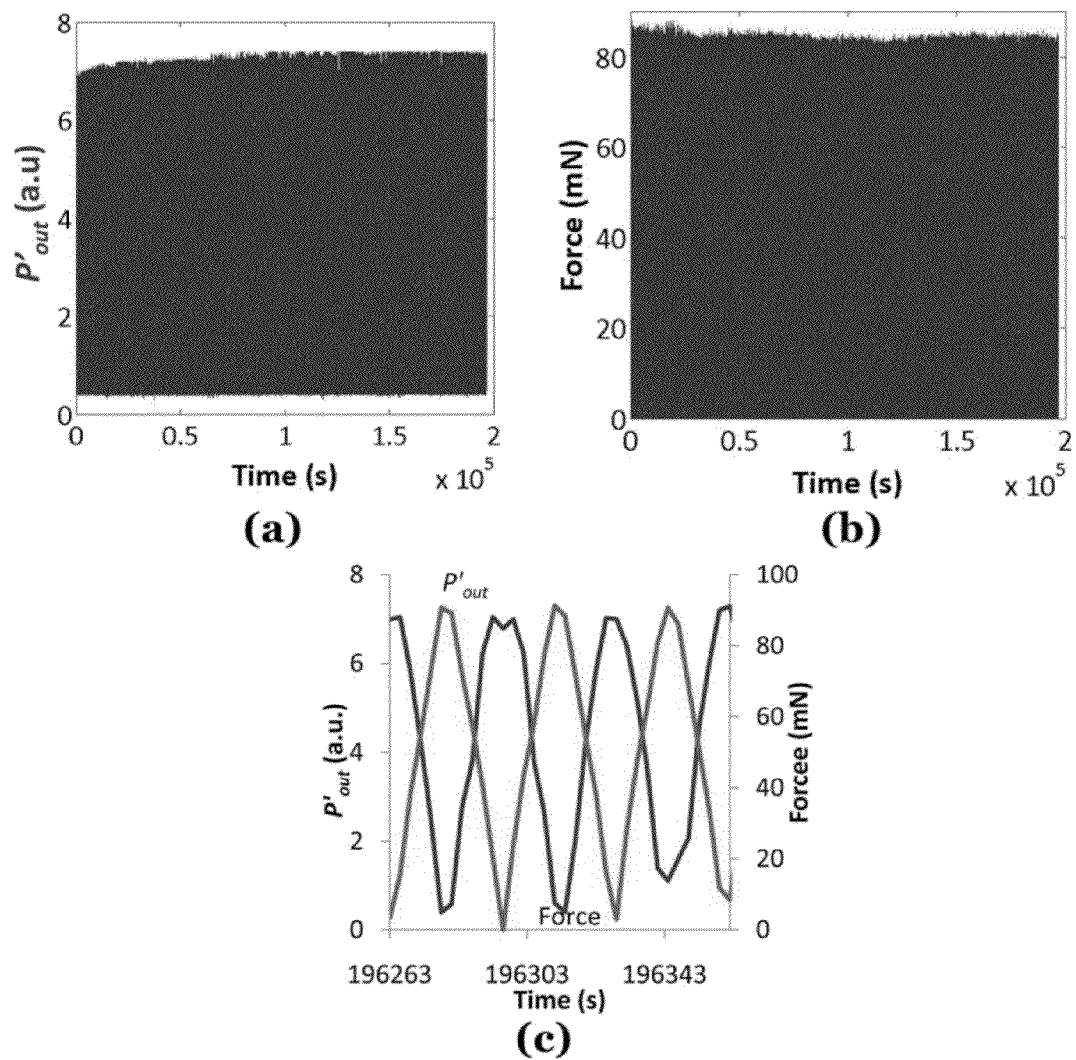
FIG. 11 shows the results of a 5 mm radius loop sensor embodiment of the present invention for $10^4$ loading-unloading cycles with FIG. 11a showing the relative transmitted power, FIG. 11b showing the force, and FIG. 11c showing a closer view of the last three cycles.

FIG. 11 shows experimental results for $10^4$ loading-unloading cycles on a 5 mm radius pear-shaped loop-sensor. The sensor is loaded and unloaded with a displacement rate of 0.4 mm/s for 6 mm displacement. Small loop size and large displacement are used to see any signs of damage to the sensor in the tests. Sensors of larger size or smaller displacement will sustain larger number of cycles. The results presented in FIG. 11 show that the sensor survives the testing, performs consistently for the entire test duration, and remains undamaged at the end of the test. From FIG. 11a it can be observed that the relative intensity value remained at the same level even at the end of the test. The load-time profile in FIG. 11b also shows consistent behavior in the beginning and end of the test, implying that the sensor structure remains robust and there is no structural failure in the sensor. A close view of the last four relative power-time and load-time cycles, overlapped on each other, is provided in FIG. 11c. There is a close correspondence between load and relative power for the entire cycle and for the entire test duration. These observations provide confidence about the use of loop-sensor for a long time in structural health monitoring applications.

2.3 Effect of Loading Rate on the Sensor Response

Figure 12:
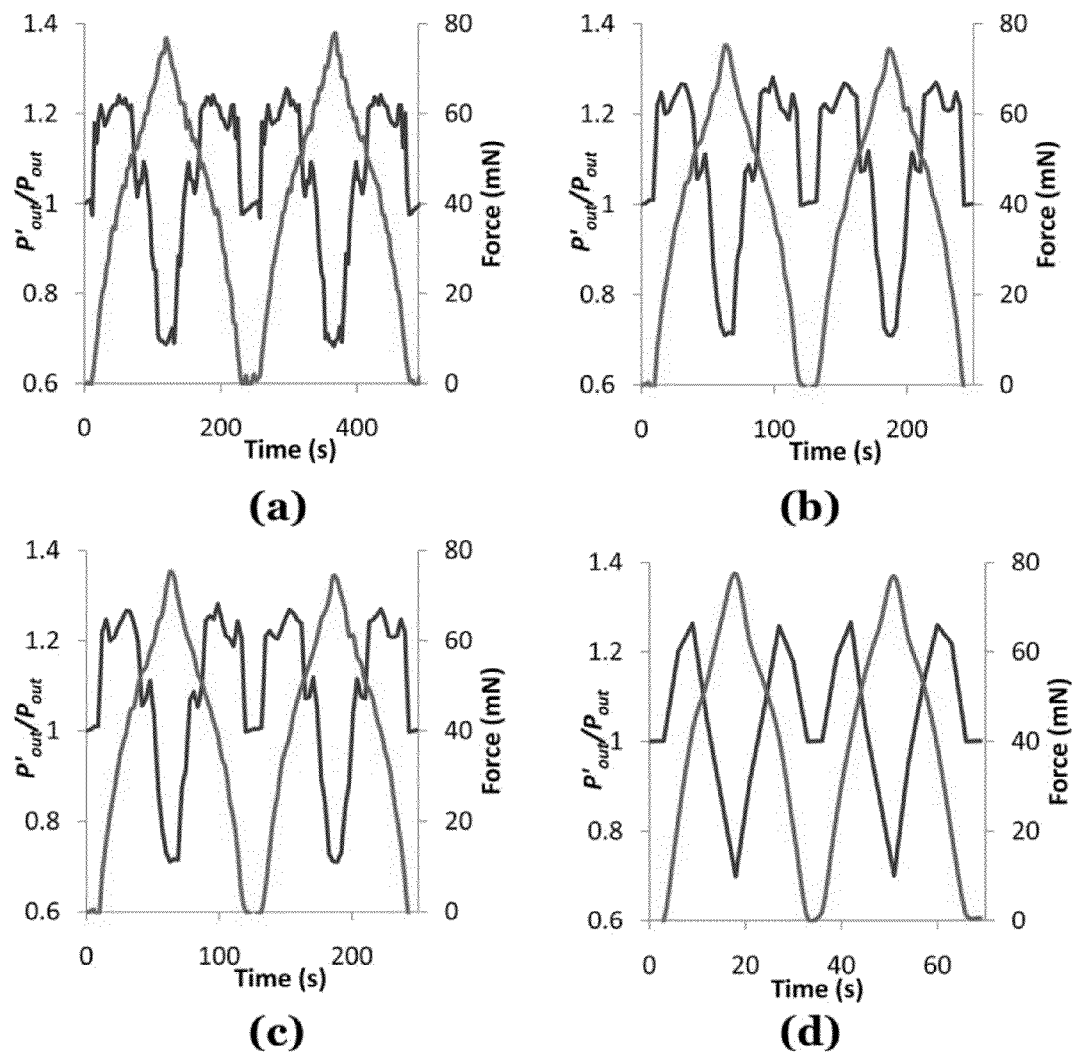
FIG. 12 shows the results of testing a 6 mm radius loop sensor embodiment of the present invention under loading-unloading cycles at four displacement rates of (a) 0.01, (b) 0.05, (c) 0.2, and (d) 0.4 mm/s.

In sensor design, another concern is the variation in the response if the loading rate is different. A 6 mm radius loop-sensor, similar to that shown in FIG. 9, was tested for variation in displacement rate in the range of 0.01-0.4 mm/s. Total displacement in the test is maintained at 6 mm. The power, force, and displacement data are collected over time in the real-time data acquisition system. FIG. 12 presents graphs of these quantities for arbitrarily selected two loading-unloading cycles for four compression rates of 0.01, 0.05, 0.2, and 0.4 mm/s. It is shown that the relative transmitted power-time and the respective force-time graphs show correspondence with each other for all loading rates. The data acquisition rate in each experiment is the same; therefore, at slower speed the graphs are well resolved, showing finer peak resolution compared to the tests at higher loading rate. Appearance of fewer peaks reinforces the possibility of using the sensors in a dual measurement range. The graphs show high repeatability and consistency, for both force and transmitted power, in loading and unloading cycles. The time to complete one cycle for each compression rate is clearly seen in these figures.

The fiber-optic sensor (extensometer) based on power modulation approach disclosed herein has a simple construction and instrumentation. The sensor is based on the principle of optical power loss from the curved section of a single mode optical fiber. Lower resolution testing over a large displacement range provides a linear power loss trend with respect to the displacement, while higher resolution testing shows presence of intermediate peaks within this region. Therefore, there is a possibility of using the sensor either at high resolution or over a large measurement range. Calibration studies show that the force resolution of $10^{-4}$ N can be obtained in these sensors. The higher resolution measurement region can be attained by using a pre-stressed loop to remain within the region between two successive resonance peaks. Cyclic loading tests at high displacement show that the sensor survived $10^4$ loading cycles and can be used in practical applications. In addition, under various loading rates, in the range of 0.01-0.4 mm/s, the sensor response remained the consistent.

The foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

REFERENCES

[1] G. N. Bakalidis, N. A. Georgoulas, N. J. Karafolas, and C. J. Georgopoulos, International Journal of Optoelectronics 8, 187-192 (1993).
[2] G. N. Bakalidis, E. Glavas, N. G. Voglis, and P. Tsalides, IEEE Transactions on Instrumentation and Measurement 45, 328-331 (1996).
[3] S. Otsuki, K. Adachi, and T. Taguchi, Sensors and Actuators B-Chemical 53, 91-96 (1998).
[4] C. K. Asawa, S. K. Yao, R. C. Stearns, N. L. Mota, and J. W. Downs, Electronics Letters 18, 362-364 (1982).
[5] F. Luo, J. Liu, N. Ma, and T. F. Morse, Sensors and Actuators A: Physical 75, 41-44 (1999).
[6] P. Nath, H. K. Singh, R. Datta, and K. C. Sarma, Sensors and Actuators A-Physical 148, 16-18 (2008).
[7] I. K. Ilev and R. W. Waynant, Review of Scientific Instruments 70, 2551-2554 (1999).
[8] M. Komachiya, H. Sonobe, T. Fumino, T. Sakaguchi, K. Kawakami, S. Watanabe, and T. Sasayama, Applied Optics 37, 1152-1158 (1998).
[9] M. Sumetsky, Y. Dulashko, J. M. Fini, A. Hale, and D. J. DiGiovanni, Journal of Lightwave Technology 24, 242-250 (2006).
[10] H. Renner, Journal of Lightwave Technology 10, 544-551 (1992).
[11] L. Faustini and G. Martini, Journal of Lightwave Technology 15, 671-679 (1997).
[12] Y. Murakami and H. Tsuchiya, IEEE Journal of Quantum Electronics QE-14, 495-501 (1978).
[13] L. Men, P. Lu, and Q. Chen, Journal of Applied Physics 103, 053107-7 (2008).
[14] Y.-G. Han, Journal of Applied Physics 105, 063103-4 (2009).
[15] P. Bianucci, J. R. Rodriguez, C. M. Clements, J. G. C. Veinot, and A. Meldrum, Journal of Applied Physics 105, 023108-5 (2009).

[16] N. Q. Nguyen, N. Gupta, T. Ioppolo, and M. V. Otugen, Journal of Materials Science 44, 1540-1550 (2009).
[17] M. L. Gorodetsky, A. A. Savchenkov, and V. S. Ilchenko, Optics Letters 21, 453-455 (1996).
[18] D. Marcuse, Journal of the Optical Society of America 66, 216-220 (1976).
[19] A. J. Harris and P. F. Castle, Journal of Lightwave Technology LT-4, 34-40 (1986).
[20] R. Morgan, J. S. Barton, P. G. Harper, and J. D. C. Jones, Optics Letters 15, 947-949 (1990).
[21] I. Valiente and C. Vassallo, Electronics Letters 25, 1544-1545 (1989).
[22] Q. Wang, G. Farrell, and T. Freir, Optics Express 13, 4476-4484 (2005).
[23] R. T. Schermer and J. H. Cole, Quantum Electronics, IEEE Journal of 43, 899-909 (2007).
[24] D. Marcuse, *Theory of dielectric optical waveguides* (Academics, New York, 1974).

What is claimed is:

1. A method for measuring the deformation of a specimen comprising the steps of:
   a) attaching a fiber-optic extensometer to a specimen of interest, wherein the fiber-optic extensometer comprises
      i) a loop of a single-mode optical fiber;
      ii) a light source attached to a first end of the loop for transmitting light having an optical power through the loop; and
      iii) a photodetector attached to a second end of the loop for detecting the light transmitted through the loop,
   b) transmitting the light supplied by the light source through the loop;
   c) deforming the specimen while the light is being transmitted through the loop, wherein deformation of the loop changes the optical power of the light being transmitted through the loop;
   d) using the photodetector to detect any change in optical power of the light passing through the loop; and
   e) coupling the photodetector to a computer having a database of the calibration curves relating the change in the optical power to the deformation of the loop, wherein the change in the optical power of the light being transmitted through the loop is related to the deformation of the loop using calibration curves.

2. The method as claimed in claim 1, wherein the loop is attached to the specimen at least two points.

3. The method as claimed in claim 2, wherein the two points are diametrically opposite each other.

4. The method as claimed in claim 1, wherein the extensometer is bonded to a surface of the specimen.

5. The method as claimed in claim 1, wherein the extensometer is embedded inside the specimen.

6. The method as claimed in claim 1, wherein the extensometer is used in a large measurement range with a lower measurement sensitivity and in a small measurement range of one intermediate peak at high sensitivity.

* * * * *